US008350767B2

(12) United States Patent
Brigham et al.

(10) Patent No.: US 8,350,767 B2

(45) Date of Patent: Jan. 8, 2013

(54) NOTCH ANTENNA HAVING A LOW PROFILE STRIPLINE FEED

(75) Inventors: Glenn A. Brigham, Chelmsford, MA (US); Marat Davidovitz, Belmont, MA (US); Zhanna Davidovitz, legal representative, Belmont, MA (US); Sean M. Duffy, Stow, MA (US); Jeffrey Herd, Rowley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 617 days.

(21) Appl. No.: 12/126,418

(22) Filed: May 23, 2008

(65) Prior Publication Data

US 2009/0322636 A1 Dec. 31, 2009

Related U.S. Application Data

(60) Provisional application No. 60/940,739, filed on May 30, 2007.

(51) Int. Cl.

| | |
|---|---|
| ***H01Q 1/28*** | (2006.01) |
| ***H01Q 13/00*** | (2006.01) |
| ***H01Q 1/00*** | (2006.01) |
| ***H01Q 21/00*** | (2006.01) |
| ***G01S 13/74*** | (2006.01) |
| ***G01S 13/08*** | (2006.01) |

(52) U.S. Cl. ........ 343/725; 343/705; 343/785; 343/722; 343/776; 343/853; 342/44; 342/51

(58) Field of Classification Search .................. 343/725, 343/705, 785, 722, 776, 853, 778, 753, 756; 342/44, 51; 607/101; 333/133

See application file for complete search history.

(56) References Cited

U.S. PATENT DOCUMENTS

| | | | | |
|---|---|---|---|---|
| 5,142,255 | A * | 8/1992 | Chang et al. | 333/204 |
| 5,175,560 | A | 12/1992 | Lucas et al. | |
| 5,488,380 | A | 1/1996 | Harvey et al. | |
| 5,949,383 | A * | 9/1999 | Hayes et al. | 343/795 |
| 6,424,313 | B1 | 7/2002 | Navarro et al. | |
| 6,621,469 | B2 * | 9/2003 | Judd et al. | 343/853 |
| 6,670,930 | B2 * | 12/2003 | Navarro | 343/776 |
| 6,963,312 | B2 * | 11/2005 | Schuneman et al. | 343/767 |
| 7,095,373 | B2 * | 8/2006 | Aikawa et al. | 343/700 MS |
| 7,180,457 | B2 | 2/2007 | Trott et al. | |

(Continued)

OTHER PUBLICATIONS

"The Terminated Lossless Transmission Line," Microwave Engineering, Third Edition, David M. Pozar, pp. 57 to 64.*

(Continued)

*Primary Examiner* — Jacob Y Choi
*Assistant Examiner* — Graham Smith
(74) *Attorney, Agent, or Firm* — Guerin & Rodriguez, LLP; William G. Guerin

(57) ABSTRACT

Described are a notch antenna and an array antenna based on a low profile stripline feed. The notch antenna includes a planar dielectric substrate having upper and lower surfaces. Each surface has a conductive layer with an opening therein. A notch antenna element is disposed on the conductive layer of the upper surface at the opening. A stripline embedded in the planar dielectric substrate extends under the notch antenna element. The stripline is adapted to couple an RF signal between the stripline and the notch antenna element. A conductive via is electrically coupled to the stripline and extends from the stripline to the opening in the conductive layer on the lower surface so that the RF signal is accessible at the lower surface.

8 Claims, 5 Drawing Sheets

U.S. PATENT DOCUMENTS

| | | | | |
|---|---|---|---|---|
| 7,417,598 | B2 * | 8/2008 | Navarro et al. | 343/853 |
| 7,884,768 | B2 * | 2/2011 | Navarro et al. | 343/702 |
| 2006/0033207 | A1 * | 2/2006 | Nakamura et al. | 257/728 |
| 2006/0145927 | A1 * | 7/2006 | Choi et al. | 343/700 MS |
| 2006/0273972 | A1 | 12/2006 | Chandler | |
| 2006/0290584 | A1 * | 12/2006 | Fontana | 343/770 |

OTHER PUBLICATIONS

International Search Report for corresponding PCT Appl. No. PCT/US08/64729 dated Dec. 12, 2008 (3 pgs).

K. Sigfrid Yngvesson, "Endfire Tapered Slot Antennas on Dielectric Substrates", IEEE Transactions on Antennas and Propagation, vol. AP-33, No. 12, Dec. 1985.

Eric L. Holzman, "A Wide Band TEM Horn Array Radiator with a Novel Microstrip Feed", 2000 IEEE International Conference on Phased Array Systems and Technology. 2000. Proceedings., May 21-25, 2000, pp. 441-444.

Raymond Tang, "Array Technology", Proceedings of the IEEE, vol. 80, No. 1, Jan. 1992.

Robert J. Mailloux, "Antenna Array Technology", Proceedings of the IEEE, vol. 80, No. 1, Jan. 1992.

* cited by examiner (TOP VIEW)

(BOTTOM VIEW)

NOTCH ANTENNA HAVING A LOW PROFILE STRIPLINE FEED

RELATED APPLICATION

This application claims the benefit of the earlier filing date of U.S. Provisional Patent Application Ser. No. 60/940,739, filed May 30, 2007, titled "Ultra-Wideband Step Notch Array Using Stripline Feed," the entirety of which is incorporated herein by reference.

GOVERNMENT RIGHTS IN THE INVENTION

This invention was made with U.S. Government support under Contract No. FA8721-05-C-0002, awarded by the United States Air Force. The government may have certain rights in the invention.

FIELD OF THE INVENTION

The present invention relates generally to electronically scanned array (ESA) antennas. More particularly, the invention relates to a notch antenna element having a low profile stripline feed.

BACKGROUND OF THE INVENTION

ESA antennas are used for a wide range of applications including cellular telephone networks, telemetry systems and automotive, shipboard and airborne radar systems. ESA antennas capable of efficiently radiating over wide bandwidths enable systems having flexibility for multiple mode operation. The growing interest in ultra-wideband (UWB) communications has lead to implementations in which a single ESA antenna is used to accommodate all frequencies of interest. ESA antennas often include an array of notch antenna elements. Each element includes an electrically conductive body having a slot. Generally, the slot includes a feed end which is positioned near a stripline feed and a radiating end which couples the RF signal in the stripline into the air or other medium. The stripline is typically embedded below the surface of a dielectric substrate and extends below the feed end of the slot to enable efficient coupling of an RF signal to be transmitted from the element. The notch antenna element can also be used to couple electromagnetic energy incident at the wide end of the slot into the stripline as a received RF signal. Various parameters affect the frequency content of the RF signal propagating from the element including, for example, the geometries of the base of the notch antenna element and the aperture in a conductive coating on the adjacent surface of the dielectric substrate, and material properties of the dielectric substrate.

Array antennas constructed of slot antennas and TEM horns generally use vertical feeds that are easily accommodated by a brick architecture as is known in the art. A description of brick architectures and tile architectures is provided in section II of the publication of Robert J. Mailloux, Proceedings of the IEEE, Vol. 80, No. 1, January 1992. Typically, array antennas constructed according to the brick architecture are deeper and heavier than array antennas employing the tile architecture where the distribution of RF signals is accomplished in one or more layers that are parallel to the antenna aperture plane. Conventional notch antennas require a feed that extends away from the antenna element so that layered connections are not practical.

SUMMARY OF THE INVENTION

In one aspect, the invention features a notch antenna. The notch antenna includes a planar dielectric substrate, a notch antenna element, a stripline and a conductive via. The planar dielectric substrate has an upper surface and a lower surface opposite the upper surface. The upper surface has a first conductive layer disposed thereon with a first opening therein. The lower surface has a second conductive layer disposed thereon with a second opening therein. The notch antenna element is disposed on the first conductive layer at the first opening. The stripline is embedded in the planar dielectric substrate and has a length that extends under the notch antenna element. The stripline is adapted to couple an RF signal between the stripline and the notch antenna element. The conductive via is electrically coupled to the stripline and extends from the stripline to the opening in the second conductive layer. The RF signal is accessible at the lower surface of the planar dielectric substrate.

In another aspect, the invention features an antenna array that includes a planar dielectric substrate, an array of notch antenna elements, a plurality of striplines and a plurality of conductive vias. The planar dielectric substrate has an upper surface and a lower surface opposite the upper surface. The upper surface has a conductive layer disposed thereon with a plurality of first openings therein. The lower surface has a conductive layer disposed thereon with a plurality of second openings therein. Each notch antenna element is disposed on the conductive layer of the upper surface at a respective one of the first openings. The striplines are embedded in the planar dielectric substrate. Each stripline has a length that extends under a respective one of the notch antenna elements and is adapted to couple an RF signal between the stripline and the respective notch antenna element. Each conductive via is electrically coupled to a respective one of the striplines and extends from the respective stripline to a respective one of the second openings in the conductive layer on the lower surface. The RF signals are accessible at the lower surface of the planar dielectric substrate.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

The invention relates to a notch antenna having a low profile stripline feed. Notch antenna elements fabricated from solid conductor materials and mounted on a printed circuit board (PCB) according to the invention provide superior heat dissipation when compared to conventional ESA antennas having vertical feeds. Thermally conductive vias (i.e., "thermal vias) extending between the metallized surfaces of the PCB conduct heat generated by components surface mounted to the opposite side of the PCB from the notch antenna elements. Excess heat is removed by airflow passing over the antenna elements. Moreover, system components and electrical routing can be fabricated in a single PCB structure. In contrast, conventional ESA antennas require mechanical connectors to couple the RF signals to or from each antenna element to other structures where the RF signals are distributed or processed. Consequently, the total volume and weight of the ESA antenna of the invention is substantially less than for a conventional ESA antenna. In some embodiments, the notch antenna elements are fabricated from lightweight non-conductive materials such as plastic and are coated with a conductive layer, making the ESA antenna advantageous for applications in which reduced weight is important.

Figure 1:
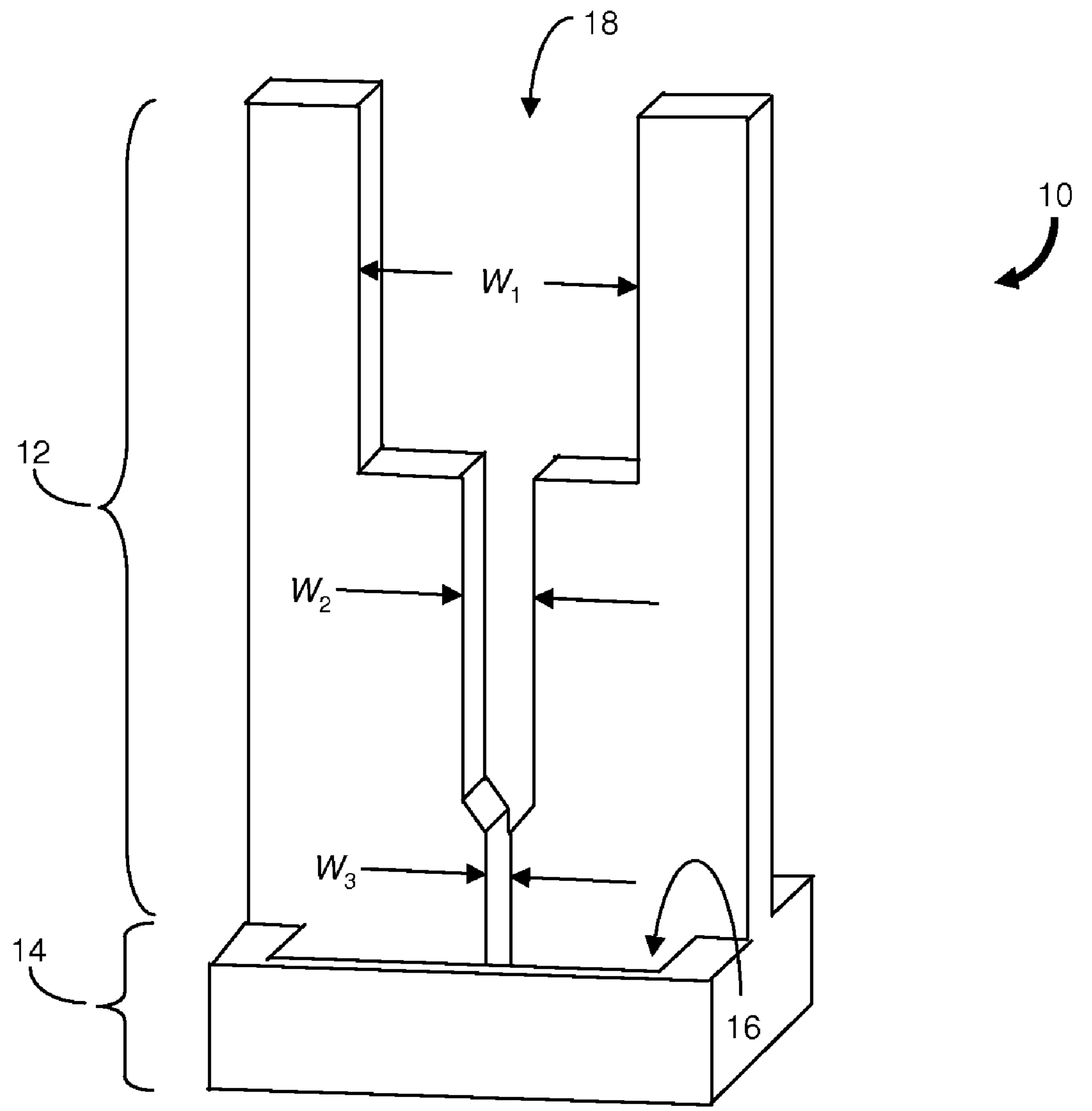
FIG. 1 is an isometric view of an embodiment of a notch antenna element according to the invention.

FIG. 1 shows an isometric view of a notch antenna element 10 that can be used in an ESA antenna in accordance with the principles of the invention. The antenna element 10 is fabricated as a solid aluminum piece and includes a vertical section 12 and a base 14 having an opening, i.e., base cavity 16. The vertical section 12 includes a stepped notch 18 having three distinct widths $W_1$, $W_2$ and $W_3$ (generally M). Various parameters, including the notch widths W and the dimensions of the base cavity 16, are selected to achieve acceptable impedance matching over a wide bandwidth.

In other embodiments, the notch antenna element 10 has different notch geometries. For example, the element 10 can have a flared notch, a tapered notch or a linearly varying notch width as is known in the art. The particular notch configuration employed may be determined according to performance requirements and manufacturing considerations.

Figure 2A:
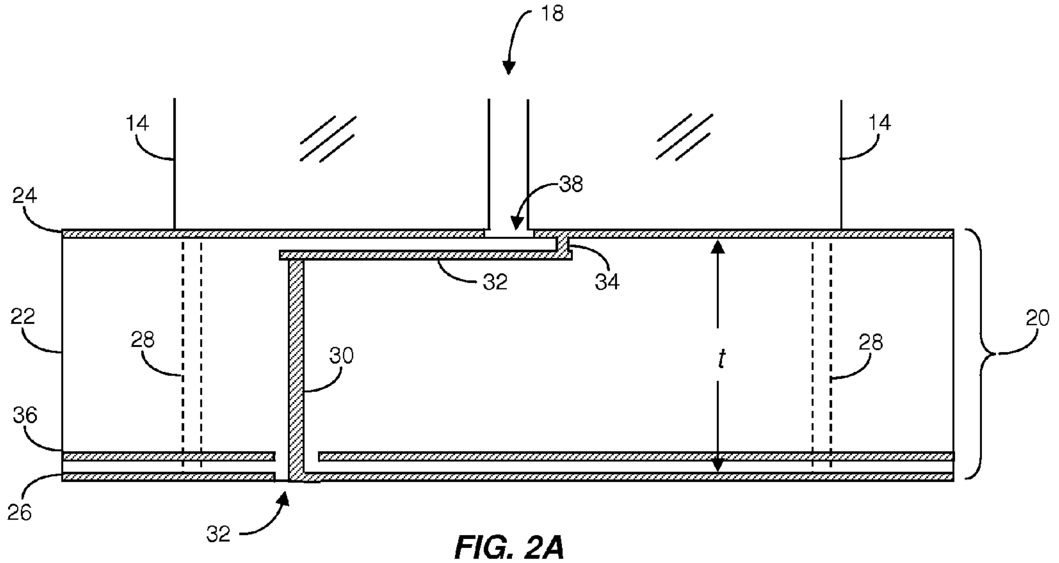
FIG. 2A and FIG. 2B illustrate a cross-sectional view and a top view, respectively, of a notch antenna element mounted to a printed circuit board according to an embodiment of the invention.

The notch antenna element 10 is mounted to a printed circuit board (PCB) 20 as shown in the cross-sectional view of FIG. 2A. Only the lower portion of the base 14 is illustrated. The PCB 20 includes a dielectric substrate 22 such as Arlon Copper Clad217, CLTE-XT, Rogers 4000 series or equivalent. The upper and lower surfaces of the dielectric substrate 22 are coated by conductive layers 24 and 26, respectively (e.g., metallization layers). In one embodiment the conductive layers 24 and 26 are thin (e.g., 0.0007 in. thickness) copper layers. The region between the two conductive layers 24 and 26 directly beneath the base 14 includes a number of electrically conductive vias 28 (shown as dashed lines as these vias do not lie in the cross-sectional plane of the figure). The electrically conductive vias 28 are arranged along a perimeter bounding a cavity region in the dielectric substrate 22. The perimeter has lateral dimensions approximately equal to the lateral dimensions of the base cavity 16.

An electrically conductive RF signal via 30 conducts an RF signal to be coupled to the notch antenna element 10. The RF via 30 passes vertically through an opening 32 in the lower conductive layer 26 and extends through most of the thickness t of the dielectric substrate 22. A stripline 32 extends horizontally from the top of the RF via 30 and is separated from the upper conductive layer 24 by a non-zero distance (e.g., 0.005 in.). The stripline 32 has a length that is perpendicular to the slot 18 at the base 14 of the notch antenna element 10 and is electrically coupled to the upper conductive layer 24 at one end through a short vertical conductive segment 34. The upper conductive layer 24 includes an opening 38 beneath the slot 18. A thin conductive layer 36 (e.g., 0.0007 in. thick copper) is embedded in the dielectric substrate 22 and separated from the lower conductive layer 26 by a non-zero distance (e.g., 0.005 in.).

Figure 2B:
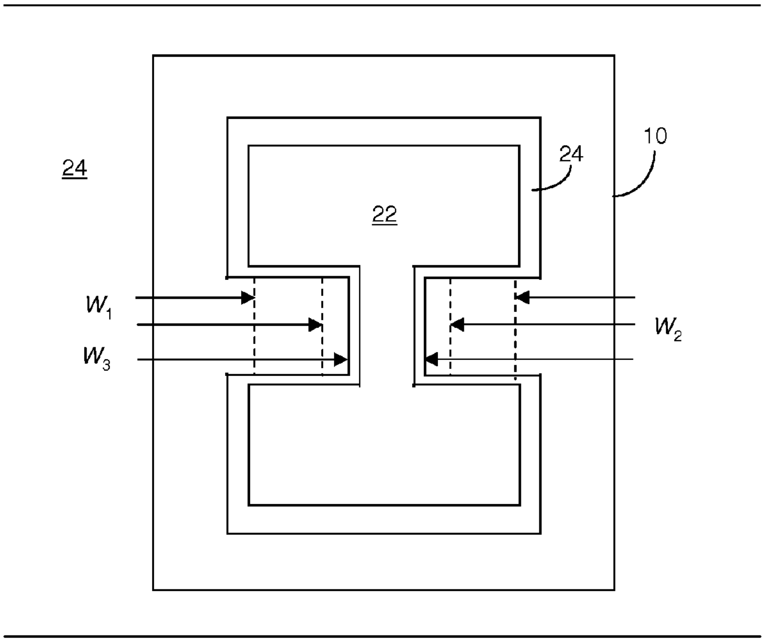

Referring also to FIG. 2B, a view of the upper surface of the PCB 20 as seen when looking down at a mounted notch antenna element 10 is shown. A small region of the upper conductive layer 24 and the upper surface of the dielectric substrate 22 are visible as the base cavity is slightly larger and similarly shaped to the opening 38. The length of the feed end of the slot 18 is oriented vertically in the figure.

The dimensions of the base cavity 16 and the opening 38 in the upper conductive layer 24, and the material properties of the dielectric substrate 22 affect the RF performance of the notch antenna element 10 thus their dimensions are chosen to satisfy operating requirements.

Figure 3A:
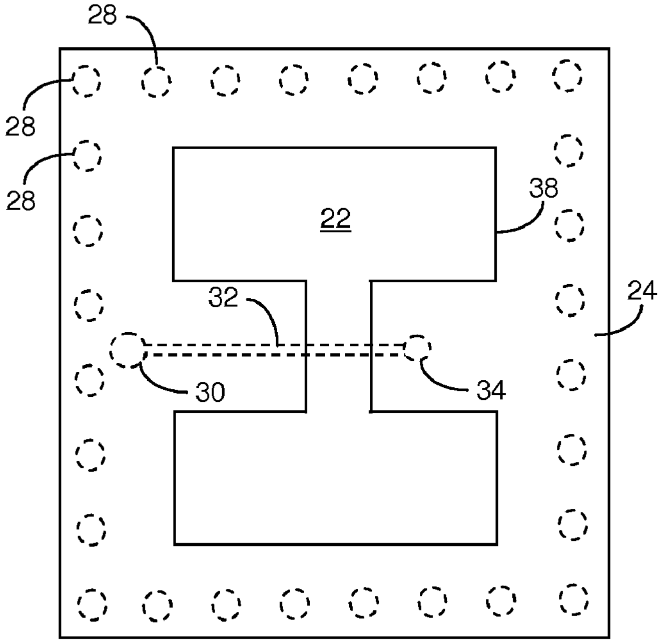
FIG. 3A and FIG. 3B illustrate a top view and a bottom view, respectively, of the printed circuit board depicted in FIG. 2.
Figure 3B:
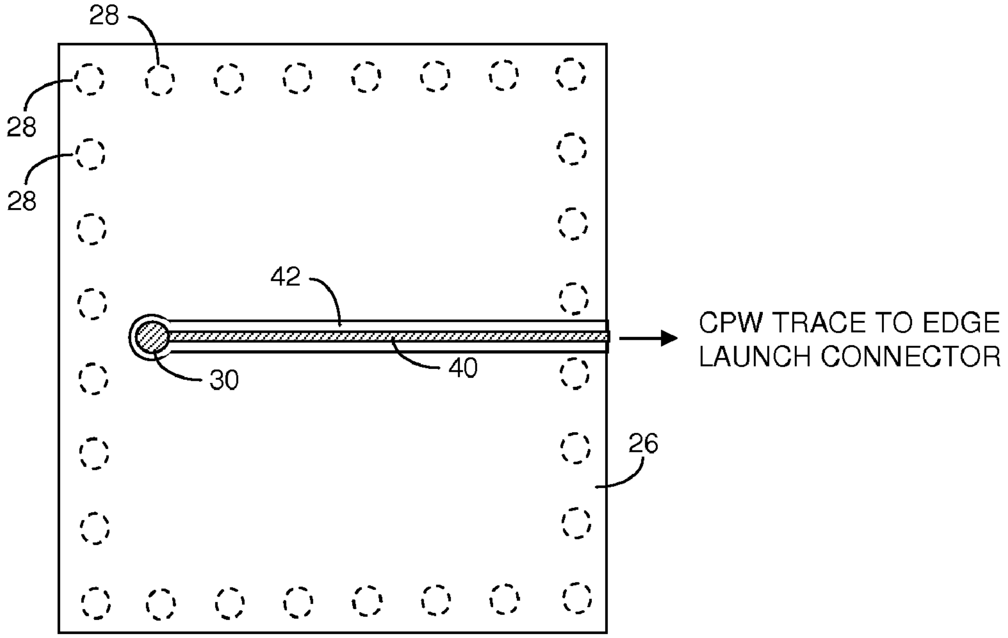

FIG. 3A shows a view of the upper conductive layer 24 with the opening 38. The stripline 32 is shown as a dashed linear feature that is embedded behind the upper conductive layer 24, that is, in the dielectric substrate at a non-zero distance from the upper conductive layer 24. Referring also to FIG. 3B, a view looking up at the lower conductive layer 26 is shown. A stripline 40 extending laterally from the bottom of the RF via 30 is separated from the lower conductive layer 26 by an opening 42. Dashed circles illustrate the locations of the electrically conductive vias 28 that extend between the upper conductive layer 24 and the lower conductive layer 26 through the dielectric substrate 22.

Figure 4:
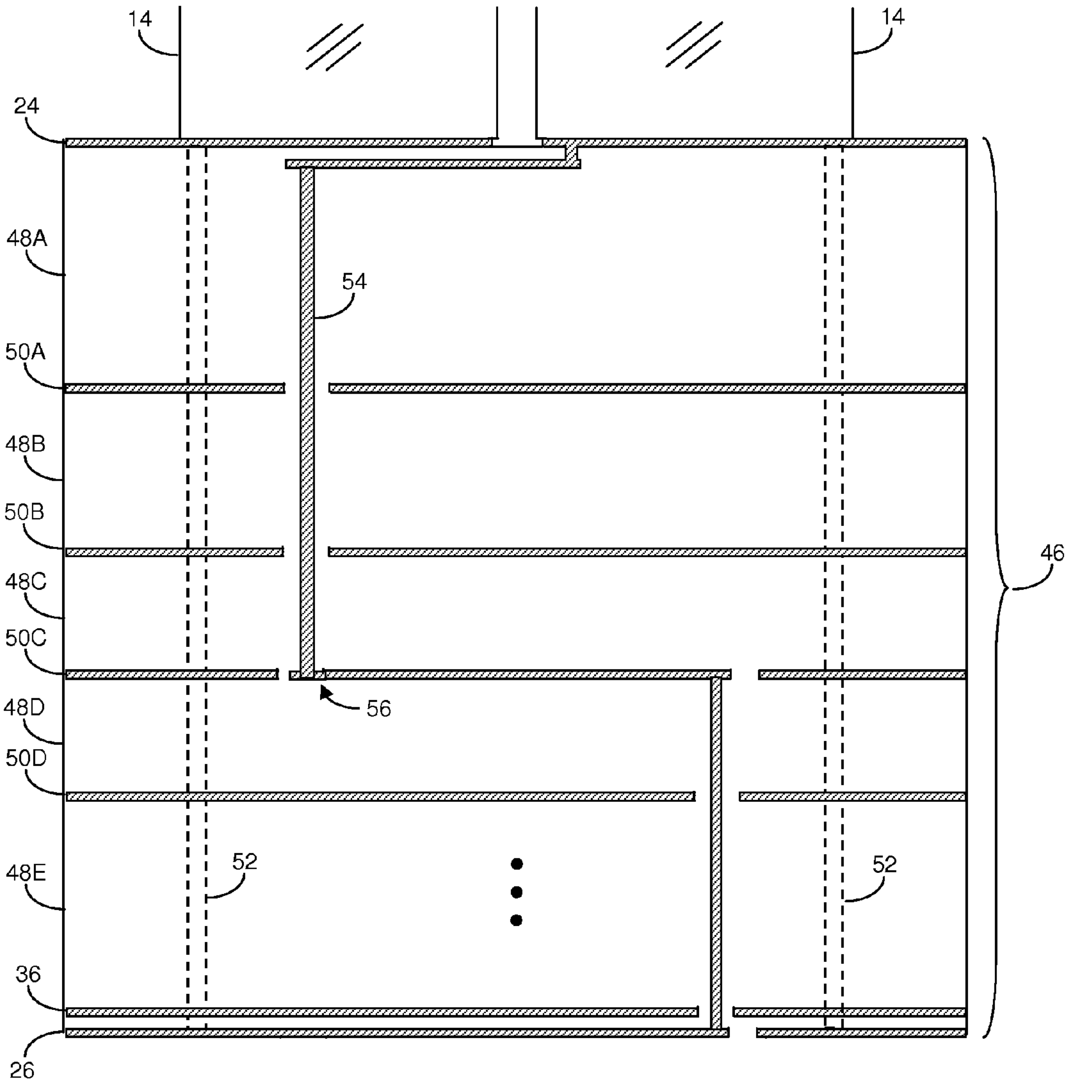
FIG. 4 illustrates a cross-sectional view of a notch antenna element mounted to a multi-layered printed circuit board according to another embodiment of the invention.

FIG. 4 shows a cross-sectional view of an embodiment of a notch antenna element mounted to a multi-layered PCB 46 in accordance with principles of the invention. In the illustrated embodiment, the PCB 46 includes multiple dielectric layers 48A to 48E (generally 48), an upper conductive layer 24, four intermediate conductive layers 50A to 50D (generally 50), an embedded conductive layer 36 and a lower conductive layer 26. In other embodiments the number of dielectric layers 48 and the number of intermediate conductive layers 50 can be different. A number of electrically conductive vias 52 extend vertically between the upper and lower conductive layers 24 and 26. An RF via 54 extends vertically through the upper three dielectric layers 48A to 48C to a distribution stripline 56 (only a small portion is visible) that extends horizontally within an opening in the third intermediate conductive layer 50C in a manner similar to that shown for the stripline 40 of FIG. 3B. The distribution stripline 56 conducts an RF signal between one or more locations or embedded components on the same layer of the multilayer PCB 46 and the notch antenna element. Embedded components can include distribution components, resistive elements, Wilkinson power dividers and hybrid couplers that are embedded in the dielectric layer 48C or 48D on the thin film distribution stripline 56. Alternatively, the distribution stripline 56 can be routed to an edge connector or other electrical coupling element attached to the PCB 46 to provide an efficient external connection. For example, the external connection may be configured to receive an RF signal to be transmitted from the antenna element or to provide an RF signal received at the antenna element. Such signals may be processed in various manners by components disposed between the antenna element and the external connector.

In some embodiments, the RF via 54 extends through the PCB 46 to a transmission line in the lower conductive layer 26. For example, larger components may be surface mounted to the bottom of the PCB 46 and electrically coupled to other layers 50 or directly to the antenna element by RF vias 54. Surface mounted components can generate significant heat therefore in some embodiments thermal vias are provided between the upper and lower conductive layers 24 and 26. Thermal vias pass through the PCB 46 at locations that do not interfere with notch antenna elements, striplines and embedded and mounted components. Consequently, the thermal vias can have lateral dimensions (e.g., diameters) substantially greater than the dimensions of the RF vias 54. The dimensions of the thermal vias may be selected according to the desired thermal transfer capability to maintain required operational temperatures of the mounted components.

Figure 5:
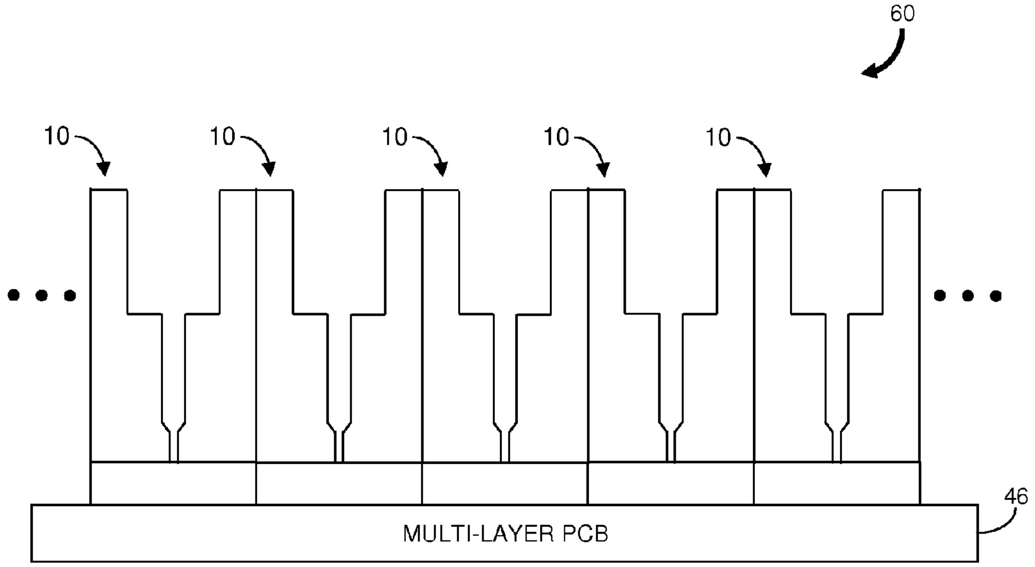
FIG. 5 illustrates a cross-sectional view of an embodiment of a two-dimensional multi-element step notch antenna array according to the invention.

FIG. 5 illustrates a cross-sectional view of an embodiment of a two-dimensional multi-element step notch antenna array 60 according to the invention. The ESA antenna 60 includes multiple rows of notch antenna elements 10 mounted to a multi-layer PCB 46. Only five notch antenna elements 10 in a single row are illustrated for clarity. Each antenna element 10 is mounted above a respective stripline and opening in the upper conductive surface as described above. In various embodiments electronic components such as phase shifters, low noise amplifiers and mixers used in receiver mode operation, and attenuators and power amplifiers used for transmit mode operation are mounted on the lower conductive surface. Depending on component dimensions, components can be embedded in or between dielectric layers. Advantageously, antenna elements 10 fabricated as solid metal structures can act as efficient heat sinks to remove excess heat generated by power amplifiers and other components.

While the invention has been shown and described with reference to specific embodiments, it should be understood by those skilled in the art that various changes in form and detail may be made therein without departing from the spirit and scope of the invention.

What is claimed is:

1. An array antenna comprising:

a planar substrate disposed parallel to a substrate plane and having a first conductive layer, a second conductive layer, and at least three dielectric layers disposed between the first and second conductive layers, each adjacent pair of the dielectric layers having a planar interface defined therebetween;

a plurality of notch antenna elements each having a base and a vertical section having a notch therein, the base and vertical section each extending perpendicular to the substrate plane, the base having a base cavity defined as an opening that extends through the base and perpendicular to the substrate plane, each of the notch antenna elements being disposed so that the base is on top of the first conductive layer at an opening therein;

a plurality of coupling striplines disposed below the first conductive layer and electrically coupled at an end to the first conductive layer, each of the coupling striplines configured to couple a radio frequency (RF) signal between the coupling stripline and a respective one of the notch antenna elements;

a plurality of RF vias each electrically coupled to an opposite end of a respective one of the coupling striplines and extending through at least one of the dielectric layers to one of the planar interfaces; and a plurality of distribution striplines each disposed in one of the planar interfaces below the coupling striplines, wherein each of the distribution striplines is electrically coupled to one of the RF vias in a respective one of the planar interfaces.

2. The array antenna of claim 1 wherein each of the distribution striplines extends to a side of the planar substrate and is electrically coupled to an RF connector.

3. The array antenna of claim 2 wherein the RF connector is an edge connector.

4. The array antenna of claim 1 further comprising at least one RF component embedded in the planar substrate.

5. The array antenna of claim 1 further comprising a plurality of intermediate conductive layers each disposed at one of the planar interfaces.

6. The array antenna of claim 1 further comprising a plurality of thermal vias disposed between the first and second conductive layers.

7. The array antenna of claim 1 further comprising at least one RF component surface mounted to the second conductive layer.

8. An array antenna comprising:

a planar substrate disposed parallel to a substrate plane and having a first conductive layer, a second conductive layer, and at least three dielectric layers disposed between the first and second conductive layers, each adjacent pair of the dielectric layers having a planar interface defined therebetween;

a first notch antenna element and a second notch antenna element each having a base and a vertical section having a notch therein, the base and vertical section each extending perpendicular to the substrate plane, the base having a base cavity defined as an opening that extends through the base and perpendicular to the substrate plane, the base of the first notch antenna element disposed on top of the first conductive layer at a first opening therein and the base of the second notch antenna element disposed on top of the first conductive layer at a second opening therein;

a first coupling stripline and a second coupling stripline each disposed below the first conductive layer and electrically coupled at an end to the first conductive layer, the first coupling stripline configured to couple a radio frequency (RF) signal with the first notch antenna element and the second coupling stripline configured to couple a RF signal with the second notch antenna element;

a first RF via and a second RF via electrically coupled to an opposite end of the first coupling stripline and an opposite end of the second coupling stripline, respectively, the first RF via extending through at least one of the dielectric layers to a first one of the planar interfaces and the second RF via extending through at least one of the dielectric layers to a second one of the planar interfaces; and a first distribution stripline electrically coupled to the first RF via in the first one of the planar interfaces and a second distribution stripline electrically coupled to the second RF via in the second one of the planar interfaces.

* * * * *